Patented Oct. 23, 1945

2,387,518

UNITED STATES PATENT OFFICE 2,387,518

STABILIZED POLYMER COMPOSITIONS

Irving E. Lightbown, Roselle, and William J. Sparks, Elizabeth, N. J., assignors, by mesne assignments, to Jasco, Incorporated, a corporation of Louisiana No Drawing. Application November 30, 1940,
Serial No. 368,036

9 Claims. (Cl. 260—94)

The present invention relates to the preservation of valuable properties of polymeric compounds, more particularly to stabilization of high molecular weight, highly saturated, linear, hydrocarbon polymers, which are normally resistant to oxidation, against depolymerization by heat and mechanical action. The invention will be fully understood from the following description.

Valuable polymers of high molecular weight prepared predominantly from low molecular weight mono-olefins are of the types known as linear or chain polymers, for the reason that the polymerization of the monomeric olefins proceeds linearly to produce chains of enormous length without ring structure formation. The branched linear polymers formed predominantly from mono-olefins which are branched, i. e., iso-mono-olefins, are of exceedingly great value on account of their high molecular weights, hydrocarbon oil solubility and chemical resistance. This is particularly true of polymers formed from isobutene, e. g., polybutenes, because these polymers may be plastic solids as well as highly viscous liquids.

The described linear polymers, and those of isobutene in particular, are quite sensitive to breakdown on moderate heating. This breakdown in molecular weight is not a heterogeneous cracking, but is a depolymerization or cleavage between carbon atoms in the chain of structural units, which in the polymers formed essentially from isobutene are indicated by the formula:

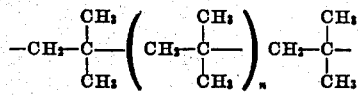

Such instability has advantages in certain respects, in that as the depolymerization occurs there is no formation of a coked residue, but on the other hand it is highly advantageous to depress depolymerization in many uses of these polymers.

While the linear polymers in their unprotected state are stable for several hours at 100° C., it is found that on heating for an extended period, depolymerization is clearly evidenced by loss of molecular weight and loss of certain desirable characteristics, such as stringiness, tensile strength, and elasticity. At higher temperatures, depolymerization is much more rapid and accelerates with increase in temperature. Therefore, it is highly desirable to raise the temperature range in which decomposition of the polymer tends to occur and to strengthen the polymer against breakdown under ordinary service and working conditions.

It is found that the addition of relatively small amounts of certain materials greatly delays the rate at which depolymerization proceeds at elevated temperatures, and apparently these materials considerably raise the threshold value at which depolymerization becomes appreciable. In addition to the breakdown of the polymers by heating, some depolymerization can be ascribed to mechanical working or attrition of the polymer, and some to the action of actinic or ultra violet rays. A further object of this invention is to stabilize the hydrocarbon polymers against depolymerization or the breakdown effect of these causes, while preserving the chemical composition and hydrocarbon oil solubility of the polymers.

The stabilizing materials employed under the present invention are organic compounds characterized by certain functional groups, such as primarily a dithiocarboxylic acid radical in which the carbon atom is attached directly both to sulfur and nitrogen atoms, as in the following structural formula:

Classes of sulfur compounds which best represent substances that contain this functional group are dithiocarbamates and thiurams. To these classes of compounds have been assigned some of the following general formulae:

Dithiocarbamates 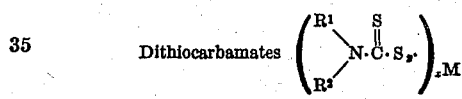

Thiurams 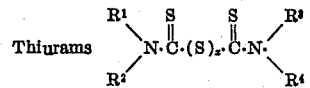

wherein $R^1$, $R^2$, $R^3$ and $R^4$ are organic or hydrocarbon radicals, preferably alkyl radicals, e. g., methyl, ethyl, propyl or their homologues, and M is a metal, such as zinc, a basic metalloid radical, such as ammonium, or a metalloid, such as selenium. In these compounds the sulfur may be partly or wholly replaced by another element of the sulfur family in the right hand column of group VI of the periodic table of elements, i. e., by selenium or tellurium, but preferably sulfur or selenium are used for practical reasons.

It is readily apparent that a common characteristic of the foregoing stabilizing agents is that they contain radicals in which a carbon atom is linked to at least 2 sulfur family atoms and also to nitrogen.

Another characteristic of the stabilizing agents is that one of the sulfur atoms in the thiocarboxyl functional group may also be linked to a third sulfur or sulfur family element atom, and in such compounds, oxygen or phosphorus may replace nitrogen. Hence, in general, the active functional groups may be composed of a carbon atom linked directly to 2 atoms of a sulfur family element, and also to an atom of a non-metal in groups V and VI of the periodic table of elements or to a polyvalent basic metal, with one of the linkages to the carbon atom in the thiocarboxyl group being a double bond.

Accordingly, the essential active functional parts of the compounds suitable for the purposes of the present invention may be depicted as having structures like the following:

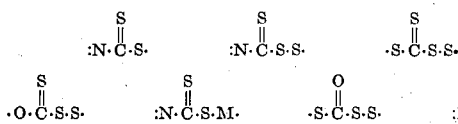

Preferably the compounds should contain at least 2 to 3 sulfur atoms in a straight chain linkage, when the carbon in the functional group is not linked to nitrogen.

The organic radicals linked to the nitrogen, phosphorus, sulfur, selenium, or oxygen having unsatisfied valences in these groupings may be cyclic (aryl or cycloalkyl) or acyclic, and salts of these types of compounds may be used, as for example zinc, cadmium, magnesium lead, or ammonium salts, preferably salts of metals that are polyvalent and of basic character.

In order to more clearly indicate the types of materials containing the described active linkage found in the effective stabilizing agents, the following specific compounds and their formulae are given, but it will be understood that these are not to be taken as limitative, but only as illustrations of the type of compounds that can be used. Other specific compounds coming within the broad definitions given above are also satisfactory with variations in the degree of their effectiveness.

Tetramethyl thiuram monosulfide

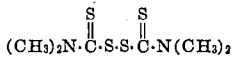

Tetramethyl thiuram disulfide

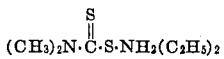

Diethyl-ammonium dimethyldithiocarbamate

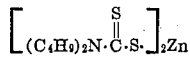

Zinc dibutyl dithiocarbamate

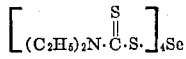

Selenium diethyl dithiocarbamate

The above list may be extended to include a number of other compounds containing the characteristic active function, e. g., acyl sulfides, xanthogenyl, thioxanthogenyl—their polysulfides, salts, phosphino and selenium analogues.

But as indicated before, the dithio acid derivatives appear to be the stronger types. However, a few examples of such other compounds which come into consideration are: zinc butyl xanthate, zinc dimethyl-monothiocarbamate, and bisethyl-xanthogenyl sulfide.

The linear polymers susceptible to depolymerization by heat, mechanical shearing and compression forces, and ultra violet rays may be prepared by several known methods, for example, polymerization of mono-olefins may be effected by inorganic halide catalysts at low temperatures. The gaseous normal mono-olefins, such as ethylene, may be polymerized under high pressure, moderately elevated temperatures and with a catalyst. The iso-olefins may be interpolymerized with a limited small amount of diolefins to form linear branched polymers having a low degree of unsaturation so as to be normally resistant to oxidation.

The particularly useful plastic or semi-solid to solid polybutenes composed essentially of isobutene polymers are formed at low temperatures, below —10° C., and more particularly below —40° C. to below —100° C. in the presence of a Friedel-Crafts type catalyst which is preferably boron fluoride. In general, the lower the temperature used in polymerizing the iso-olefins the higher the molecular weight of the polymer produced. Various polymerization catalysts, such as clays and various metal halide catalysts such as aluminum chloride may be used under suitable conditions known to the art. Also purity of the reactants, control of the conditions of the reaction as by use of diluents and suitable refrigerants, and the use of polymerization promoting agents are well known factors for increasing the molecular weight of the product.

The amount of the stabilizing agent to be added to the polymers for effecting their preservation is, in general, very small but varies with the particular polymer, the particular stabilizing agent, and the degree of stability desired. Usually more of the stabilizing agent is added to the high molecular weight polymers, in general, however, the amount of the stabilizing agent used is less than 5%, preferably less than 2%, and may be even as low as 0.01% by weight of the polymer to which it is applied.

In order to avoid misunderstanding, it should be noted that the depolymerization of the polymers is not in the ordinary sense the result of oxidation, and the stabilizing materials do not act as do ordinary oxidation inhibitors, although some of them may act in such a manner in petroleum oils or unsaturated hydrocarbons, such as rubber. The linear polymers utilized in conjunction with the stabilizing agents are normally resistant to oxidation and do not require protection against decomposition by oxygen. They are also, for the most part, chemically inert to the action of substances such as acids or alkalies at ordinary temperatures, and are not vulcanized by conventional methods applicable to rubber. The type of decomposition referred to in this case is strictly a depolymerization which may be caused by heat alone, either in the presence or absence of air or oxygen, or, also, by vigorous mechanical working which tends to break down the molecular aggregates. As mentioned before, the linear polymers of mono-olefins may be considered as substantially saturated and act like saturated substances with respect to oxidation, being saturated with respect to hydrogen to the extent that they have iodine numbers of a low order. They are substantially immune to autoxidation.

The disclosed stabilizing agents act to decrease the depolymerization rate either in the presence or absence of oxygen, and, furthermore, impart increased bond strength to the polymer molecules by thus preserving the molecular weights of the polymer and increasing their strength, the polymers can be preserved from becoming excessively tacky when, as originally produced, they are of a non-tacky nature. The high molecular weight polymers with a stringy characteristic, as for example polymers having a molecular weight of about 30,000 and more, can be made to retain this desirable characteristic which is highly useful in lubricants by the use of stabilizing agents. Stabilizing agents similarly perform the useful function of preserving the strength and molecular weight of the polymers in blending operations which require mechanical mixing and some elevation of temperature. It should be noted that the stabilizing agent is to be used with polymers having molecular weights ranging from about 30,000 up to as high as 300,000, or more, and having low iodine numbers, e. g., below 5 to prevent degradation, as for example, when such polymers are worked on a rubber mill, either hot or cold.

As an example, a polybutene of about 200,000 molecular weight, as determined by the Staudinger viscosity method and having an iodine number which is nearly zero, was worked on a hot mill at 105° C. for ten minutes. After pressing the polymer into a sheet, the tensile strength was found to be 1,510 pounds per square inch. When 1% of tetramethyl thiuram disulfide was added to the polymers before working on the hot mill, and the polymer was then subjected to the same treatment on the mill, the tensile strength of the resulting milled sheet was found to be 1,730 pounds per square inch.

As a further example, samples of an iso-olefin polymer having an initial molecular weight of the order of 70,000 was subjected to a heat breakdown test at a temperature of 300° F. Samples of the polymer containing the stabilizing agents in a 0.1% concentration were heated in an oven for 7 hours at 300° F. and subjected to ultra violet light at room temperature for 48 hours. The results of these tests show that the stabilizing agents of this invention were effective against breakdown at this high temperature, and that the preferred stabilizing agents, referred to, were particularly good in permitting the polymer to withstand breakdown by the action of ultra violet light. The results of these tests can be seen from the following table:

*Polymer breakdown at 300° F.*

| | Percent | Molecular weight of polymer | | | Percent loss |
|---|---|---|---|---|---|
| | | Initial | 300° F. for 2 hrs. | 300° F. for 7 hrs. | |
| Polymer (unstabilized) | | 80,000 | 51,000 | 38,500 | 50.7 |
| Polymer+selenium diethyl dithiocarbamate | 0.1 | 70,000 | 75,600 | 69,200 | 1.1 |

In comparison to many substances known as anti-oxidants, these stabilizing agents of the present invention prove to be in a class by themselves in preventing deterioration of the polymers, and, moreover, prove to permit much less breakdown by ultra violet light than the well known phenolic and amino anti-oxidants.

While this invention is described as relating particularly to the improvement of synthetic linear polymers, and especially to branched linear polymers of iso-olefins, it will be understood that the stabilizig agents may be also used with modified hydrocarbon polymers of analogous compositions and structure, as for example hydrogenated rubber, hydrogenated or saturated polymers of diolefins such as saturated polymers formed from isoprene or butadienes, interpolymers of olefins with diolefins, and the like, when such polymers have sufficiently low iodine numbers to be normally resistant to oxidation.

It is to be understood that in this specification the hydrocarbon polymers which are stabilized are composed substantially of hydrogen and carbon and are not vulcanized, cured, nor sulfurized to any substantial extent. Consistent with the objects of preserving the high molecular weights of the hydrocarbon polymers, they are not subjected to a treatment which causes substantial degradation in their molecular weights nor to a treatment which substantially diminishes their solubility in hydrocarbon oils and solvents. In the stabilized polymer compositions thus provided, the chemical composition of the hydrocarbon polymer is preserved in the presence of the small added amount of the stabilizing agent, and accordingly the stabilized polymer compositions have miscibility and compatibility with hydrocarbon oils and various similar hydrocarbon compositions which makes them valuable blending agents therewith.

The stabilized hydrocarbon polymer compositions may be used in conjunction with other compositions, for example the stabilized polymers may be used as ingredients of hydrocarbon fuels, lubricating compositions such as oils and greases, as plasticizers in rubbers or resins, in mixtures with waxes or asphalts, or in various other compositions for which these polymers are suitable.

The present invention is not to be limited to any theory on the action of the stabilizing agents, nor to any particular polymers; and the specific embodiments of this invention which have been used as illustrations are not intended to limit the scope of the invention which is subject to many modifications.

We claim:

1. A polymer composition of increased stability against breakdown by depolymerization, comprising a high molecular weight, substantially saturated, linear polymeric hydrocarbon normally resistant to oxidation but having a tendency to depolymerize at about and above 100° C. and about 0.01% to 5% of an organic stabilizing compound containing a thiocarboxyl function in which a carbon atom is directly linked to 2 atoms of a sulfur family element and also to an atom of a non-metallic element in group V of the periodic table of elements, one of said sulfur family atoms being linked to another atom of a sulfur family element.

2. An improved polymer composition of increased stability against depolymerization, comprising a high molecular weight, linear iso-olefin hydrocarbon polymer normally resistant to oxidation, and a small quantity of an organic stabilizing agent containing a dithiocarboxyl functional group in which a carbon atom is directly attached to nitrogen and 2 sulfur atoms.

3. A composition according to claim 2, in which said stabilizing agent is a thiuram sulfide.

4. A composition according to claim 2, in which said stabilizing agent is a dithiocarbamate.

5. A composition according to claim 2, in which said stabilizing agent is a dithioxanthogenyl sulfide.

6. A composition according to claim 2, in which said stabilizing agent is tetramethyl thiuram disulfide.

7. A composition according to claim 2, in which said stabilizing agent is selenium diethyl dithiocarbamate.

8. An improved polymer of increased stability toward heating, comprising isobutylene polymers having a molecular weight above 30,000 and between 0.1% and 5% of a stabilizing agent containing a dithiocarboxylic acid functional group in which the carbon atom is directly attached to nitrogen and to sulfur.

9. A polymer composition of increased stability against breakdown by depolymerization, comprising an iso-olefin polymer having a molecular weight above about 30,000 and about 0.01% to about 5% of an organic stabilizing compound containing a thiocarboxyl radical in which a carbon atom is directly linked to at least two atoms of an element in the sulfur family, which includes sulfur, selenium, and tellurium, and also to an atom of a non-metallic element in group V of the periodic table of elements, which includes nitrogen, phosphorus, oxygen, and said sulfur family elements, one of said sulfur family atoms being linked to a third atom of a sulfur family element.

IRVING E. LIGHTBOWN.
WILLIAM J. SPARKS.